United States Patent [19]

Laurent et al.

[11] Patent Number: 5,185,051
[45] Date of Patent: Feb. 9, 1993

[54] HOOK FOR USE IN AN APPARATUS FOR MAKING A TIRE REINFORCEMENT

[75] Inventors: Daniel Laurent, Meylan; Jean C. Mayet, Clermont-Ferrand, both of France

[73] Assignee: Compagnie Generale des Etablissements Michelin, Clermont-Ferrand Cedex, France

[21] Appl. No.: 776,893

[22] Filed: Oct. 16, 1991

Related U.S. Application Data

[60] Continuation of Ser. No. 574,512, Aug. 28, 1990, abandoned, which is a continuation of Ser. No. 464,617, Jan. 3, 1990, abandoned, which is a continuation of Ser. No. 148,488, Jan. 26, 1988, abandoned, which is a division of Ser. No. 40,360, Apr. 20, 1987, Pat. No. 4,801,344.

[30] Foreign Application Priority Data

Apr. 25, 1986 [FR] France ........................... 86 06159

[51] Int. Cl.⁵ ............................................. B29C 31/00
[52] U.S. Cl. ........................... 156/397; 156/117; 156/177; 156/440
[58] Field of Search ............... 66/116, 208; 156/117, 156/177, 397, 439, 440

[56] References Cited

U.S. PATENT DOCUMENTS

| 726,758 | 4/1903 | Reuther | 66/116 |
| 1,286,350 | 12/1918 | Kopp | 66/116 |
| 3,438,223 | 4/1969 | Linstead | 66/116 |

FOREIGN PATENT DOCUMENTS

92377 11/1896 Fed. Rep. of Germany ........ 66/116

OTHER PUBLICATIONS

Catalog of Allen and Hanburys Ltd., London-Oct.-1958.

Primary Examiner—Tim Heitbrink
Attorney, Agent, or Firm—Brumbaugh, Graves, Donohue & Raymond

[57] ABSTRACT

A cord retention arm for use in an apparatus for making a tire reinforcement from a continuous cord and applying the reinforcement to a tire core. The cord retention arm includes an extended support having a bent end terminating in a tip for supporting a loop of the cord. The extended support includes a portion spaced more remotely from the bent end and a portion intermediate the more remote portion and the bent end, the portions being bent with respect to each other to define a plane, the said bent end extending laterally and diagonally to the plane.

6 Claims, 12 Drawing Sheets

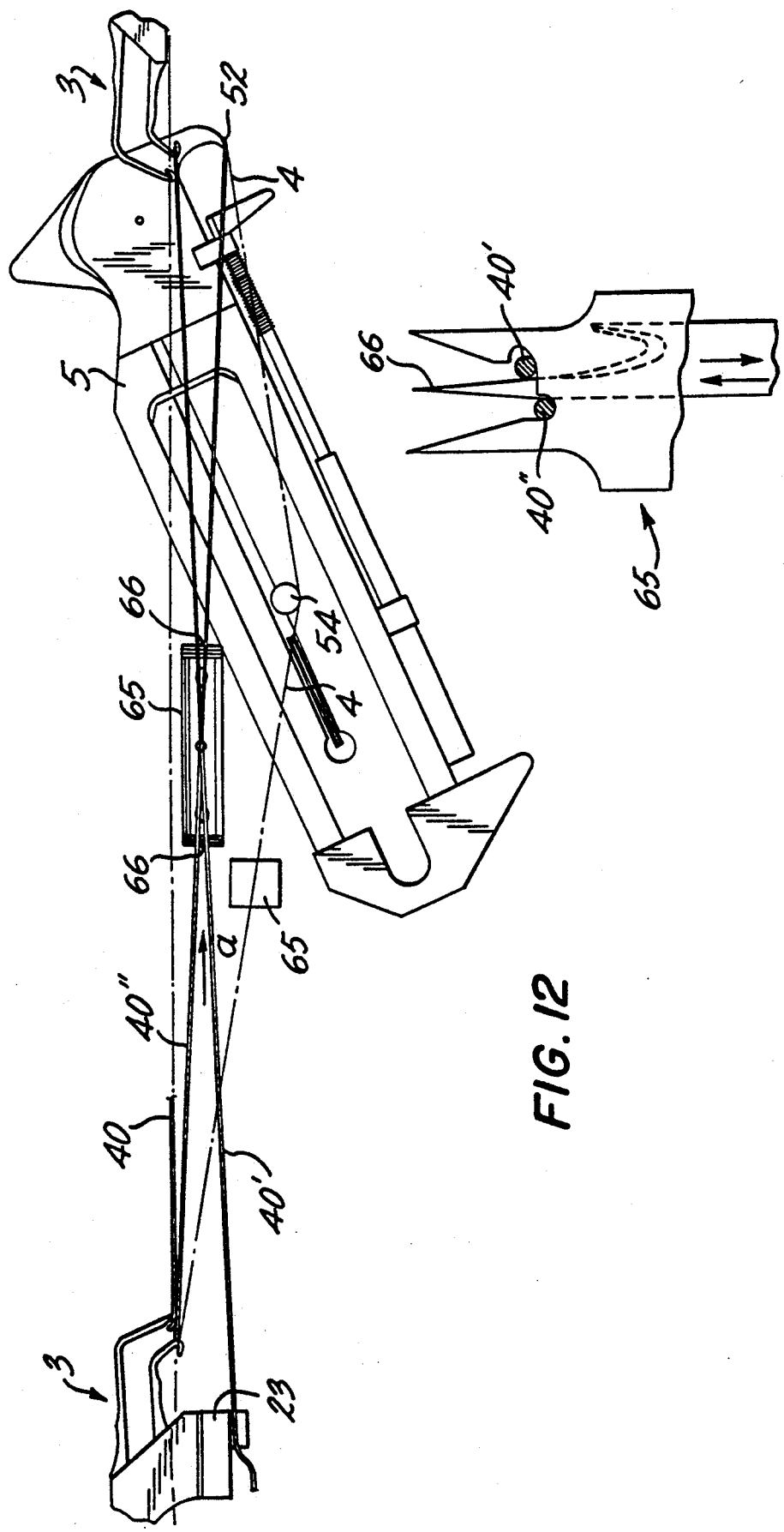

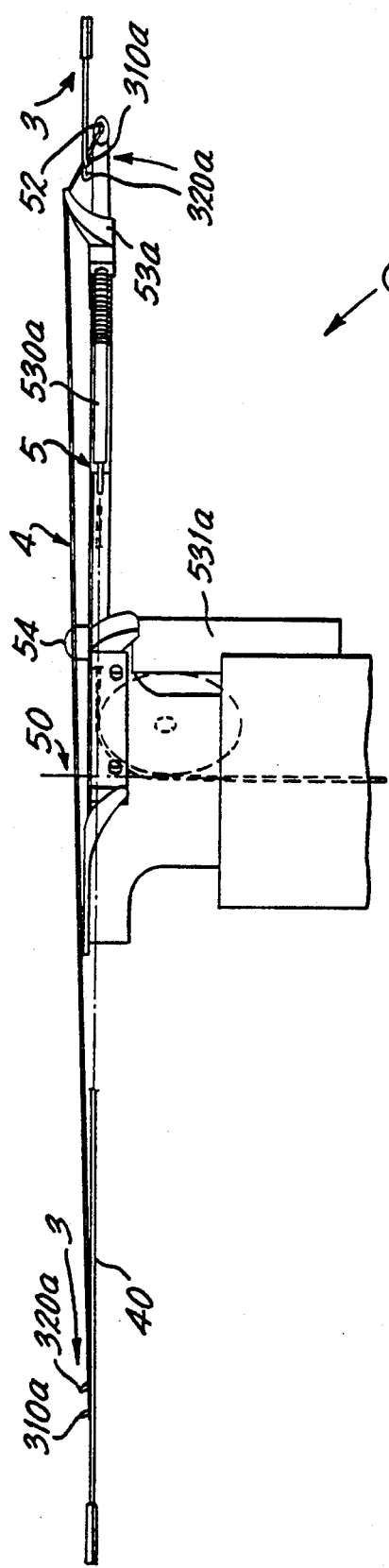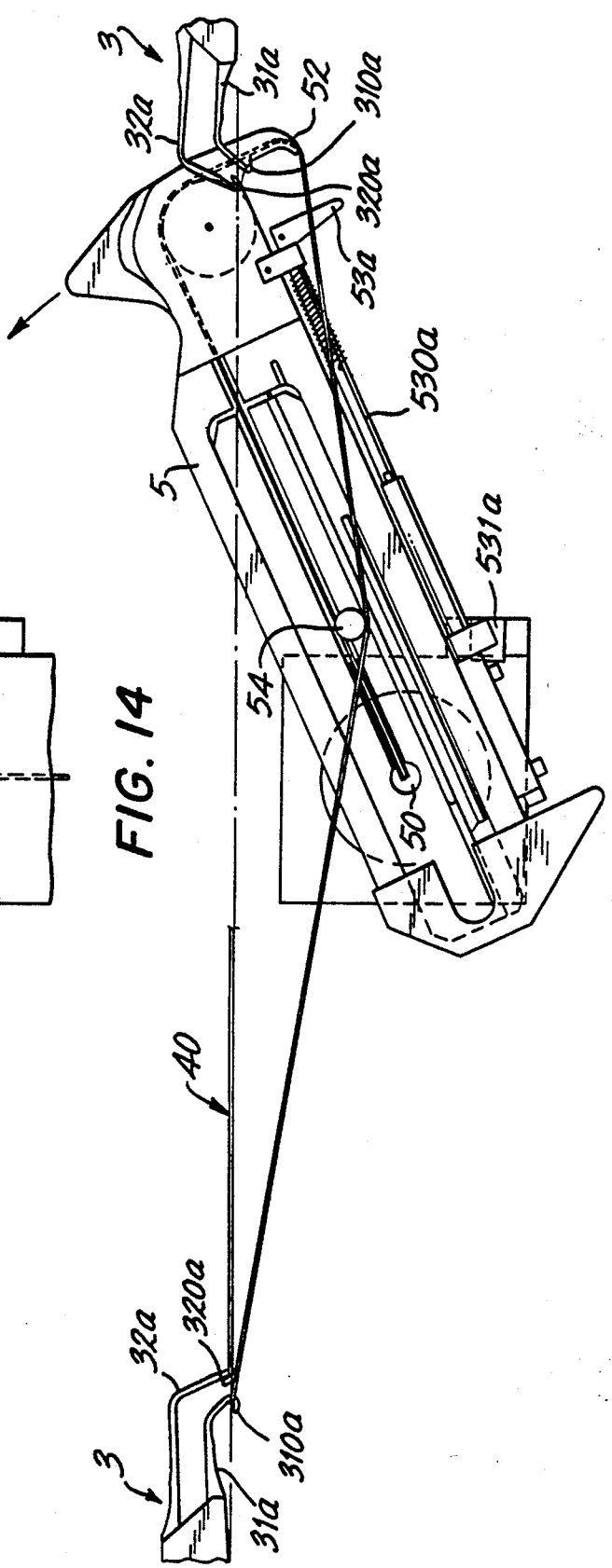
FIG. 14
FIG. 13

HOOK FOR USE IN AN APPARATUS FOR
MAKING A TIRE REINFORCEMENT

This application is a continuation of application Ser. No. 07/574,512 filed on Aug. 28, 1990 now abandoned, which is a continuation of Ser. No. 464,617, filed on Jan. 3, 1990, now abandoned, which is a continuation of Ser. No. 148,488, filed on Jan. 26, 1988, now abandoned, which is a division of Ser. No. 40,360, filed on Apr. 20, 1987, now U.S. Pat. No. 4,801,344.

BACKGROUND OF THE INVENTION

The present invention relates to the manufacture of tires. More particularly, it concerns a method and an apparatus for the manufacture of reinforcements for tires.

Tires are reinforced in particular by at least one ply known as a carcass ply, which today is most frequently disposed radially, anchored in each of the two beads having at least one bead ring each. The plies comprise a plurality of adjacent cords which, in the case of radial carcasses, are included approximately within a plane passing through the axis of rotation of the tire.

The expression "cord" is to be understood in its broadest sense, namely both as a single cord and as a cable formed by the assembling of several single cords, or an equivalent assembly.

In the prior art, the most customary method consists in preparing, from a large number of spools of simultaneously unwound cords, plies the cords of which are oriented parallel to their greatest length and are embedded in rubber. These plies are then cut along a desired angle, for instance a right angle, into pieces of suitable length, whereupon the edges of the pieces of plies parallel to the cords are brought together, with or without superimposing of cords, in order to form intermediate or semi-finished products used upon the manufacture of the tire proper. The manufacture of such semi-finished products is illustrated, for instance, by U.S. Pat. No. 3,573,135. This method requires costly equipment and makes it necessary to manufacture a large number of different plies as a function of the widths of plies required by the sizes of tires to be produced.

In accordance with the state of the art, other manners of producing the reinforcements for tires are also known. According to one of such manners, the reinforcement cord or cords are disposed one after the other and continuously around a core which defines the inner surface of the tire, so as to form a tire reinforcement. Examples of this are to be found in U.S. Pat. Nos. 852,855, 1,328,006 and 1,321,402. However, the mechanization of the laying of the cord around a core is very complicated due to the fact that the cord develops in axial, radial and axial and radial directions in the space outside the core.

In accordance with another principle, the reinforcement cord is wound around two bead rings which are in their final circular shape or else are still slit and disposed flat while the cord is wound. This is illustrated, for instance, by Patents WO83/02749, U.S. Pat. Nos. 2,139,840 and 1,349,390. Here again, the method has numerous drawbacks related to the fact that a reinforcement is constructed which is very far from its final shape in the tire, particularly if it is constructed flat. In the event that the reinforcement is constructed around circular bead rings, it is necessary to effect a shaping by radial elevation of the central zone of the cords disposed between two bead rings, which is customarily done by means of pneumatic devices, and therefore lacks precision from the standpoint of respect for the geometry.

These known techniques for the manufacture of a reinforcement for tires from a single cord are therefore complicated and non-productive.

SUMMARY OF THE INVENTION

The object of the present invention is to provide a method of producing a reinforcement no longer from semi-finished products in the form of ply but from a single cord, which does not have the drawbacks of the previous methods. The invention relates to the manner in which the cord is disposed in order to constitute the reinforcement.

According to the invention, a method of manufacturing a tire reinforcement formed from a continuous cord is characterized by the fact that (a) the continuous cord is hooked to retention means disposed in two circles which are a distance apart corresponding to the length of the path of the cord from one side of the reinforcement to the other so that the cord disposed in this way defines a cylinder by a plurality of passes back and forth from one retention means to another, (b) by a suitable movement of the retention means, the cord which is disposed in this way is folded back on and around a rigid core which defines the shape of the inner surface of the tire, (c) anchoring of the cord being assured, the retention means are released.

The solution according to the invention consists therefore in constructing a cylinder formed of lengths of reinforcement cords which are substantially parallel to the axis of the cylinder and held at each end by retention means, the entire reinforcement being formed of a single continuous cord hooked to all the retention means; the cord retention means are then displaced in such a manner that reinforcement thus constituted surrounds a rigid core defining the inner surface of the tire, that is to say in such a manner that the reinforcement assumes its place in the future tire.

The expression "cord" is used to designate the reinforcement material in general while "length of cord" designates more precisely the amount of cord disposed between two retention means located on opposite sides of the rigid core.

The anchoring of the cord is to be effected by any means with due consideration of the function of the reinforcement. When the reinforcement is a tire carcass reinforcement, the anchoring must permit the carcass produced in this manner to withstand the inflation pressure of the tire. A bead ring, for example, will be used.

Due to this method, the creation of a reinforcement by the hooking of a cord to retention means is effected in a simple configuration in which all the lengths of cords between two retention means are disposed substantially parallel to each other so as to form a cylinder with axis parallel to the orientation of the lengths. In equivalent manner, the circles formed by the retention means may be of slightly different diameters, so that the lengths of cord then define a conical frustum.

Thus, due to recourse to the cord retention means, one can, in very simple manner, start the construction of a reinforcement which will be disposed around a rigid core, the recourse to a rigid core being very favorable from the point of view of uniformity and precision of manufacture. By "rigid core" there is understood a substantially nondeformable core, for instance of the type found in molds used for the manufacture of polyurethane tires, as illustrated in U.S. Pat. No. 4,279,856.

The illustration of the invention given in the following shows the manufacture of a rayon carcass reinforcement for passenger car tires. However, it is obvious that the scope of the invention is not limited to the manufacture of this single type of reinforcement nor to this single type of cord but can it also find use for tire belts.

Due to the invention it is possible to start the manufacture of a carcass reinforcement immediately in circular shape independently of the diameter of the bead rings of the future tire.

DESCRIPTION OF THE DRAWINGS

The accompanying drawings illustrate the invention in non-limitative manner; they make it possible clearly to understand its operation and to note all its advantages.

FIGS. 12 and 12a show the end of the operating cycle of the apparatus.

FIGS. 13 and 14 are views in planes perpendicular to each other of certain parts of the apparatus.

DETAILED DESCRIPTION OF THE INVENTION

Figure 1:
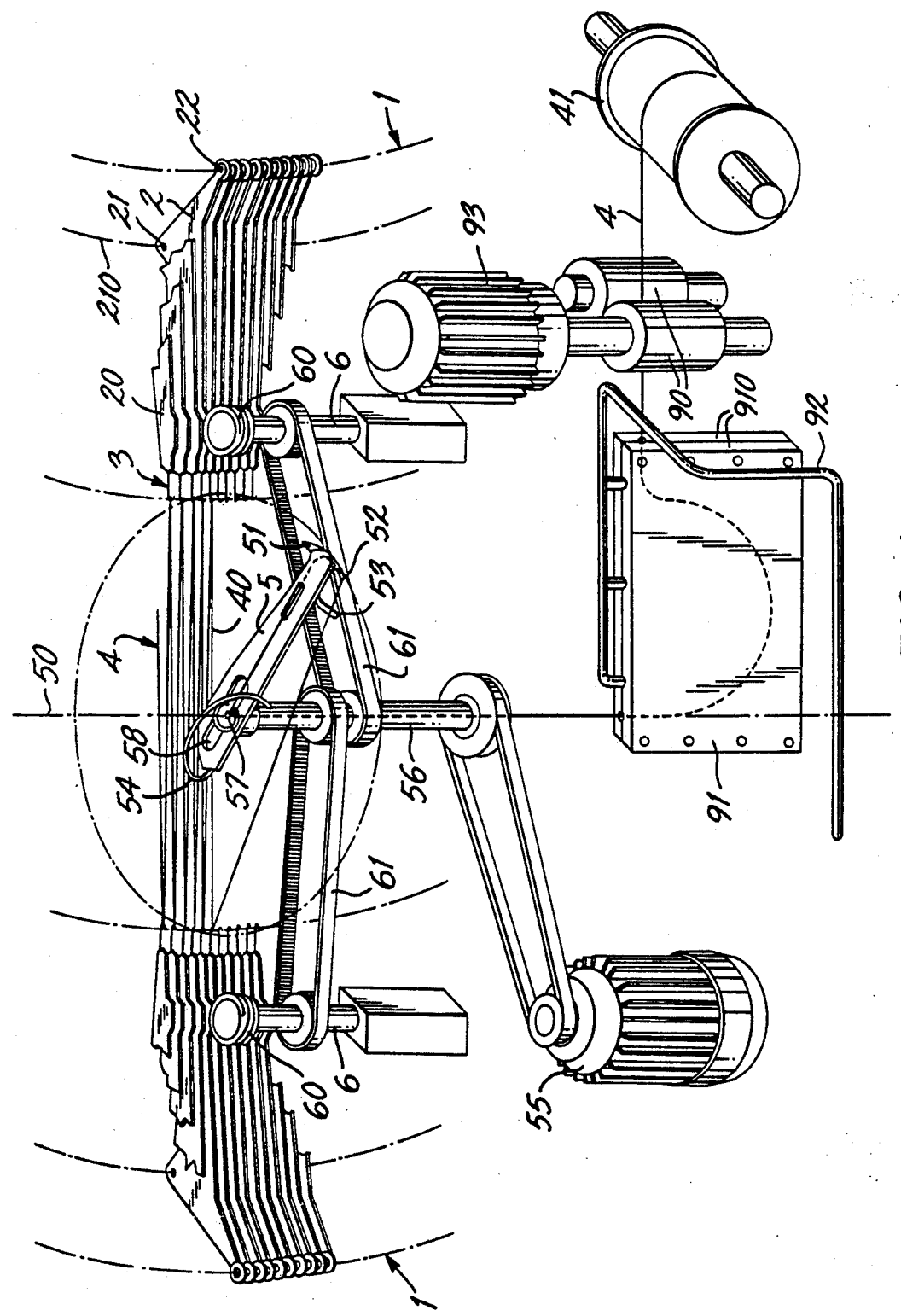
FIG. 1 is a perspective view showing the overall arrangement of an apparatus machine according to the invention.

The apparatus of the invention, a general view of the main parts of which is given in FIG. 1, comprises two rings 1 of support arms 2. These rings 1 and the tire to be produced are coaxial. The axially inner end 20 of the support arms 2 can be displaced axially and radially; this means that the movement of the end 20 has at least one radial component and one axial component. The end 20 bears retention means 8 for the cord 4. The support arms 2 furthermore have a pivot point 21 and a drive point 22. The pivot points 21 of all the support arms 2 form a circle 210 of invariable diameter, coaxial to the tire to be produced and axially displaceable. The drive points 22 can be displaced, all simultaneously in each ring 1, axially with respect to the pivot points 21. These two movements (axial displacement of the pivot points 21 and displacement of the drive points 22 with respect to the pivot points 21) make it possible to impart the desired movements to the support arms 2 so that their ends 20 can describe the desired movement upon the folding of the cord 4 around a core. The folding around a core is explained in detail further below. The ends 20 therefore form a circle which is co-axial to the tire to be produced, of variable radius and of variable axial position in order to be able to proceed with the folding of the cord on and around a core. The variable axial position furthermore permits adaptation to different lengths of cord. It will be seen that the two rings 1 are symmetrical; however, this symmetry is not indispensable, it is merely very convenient in order to produce a tire of symmetrical architecture. The movements of the two rings are preferably coordinated and symmetrical.

The apparatus also comprises a rotary arm 5 the axis of rotation 50 of which is substantially perpendicular to the axis of the rings 1 and is preferably located radially to the outside of the cylinder defined by the retention means 3 for the cord 4. The axis 50 is located axially substantially midway between the retention means 3. This rotary arm 5 is driven by a motor 55 via a drive shaft 56. It is necessary that upon each turn of the rotary arm 5 the rings 1 have turned through an angle corresponding to the distance between two adjacent retention means 3. A tapered cord dispenser 51 facilitates the passage of the end of the rotary arm 5 between two adjacent retention means 3. The direction of rotation of the rotary arm 5 can be noted in FIG. 1 by this dispenser 51 which is directed in the direction of movement. The rotary arm 5 bears cord delivery means comprising essentially in this example an orifice 52 for the departure of the cord 4, located at the rear with respect to the movement. Then one can also provide, between the end and the center of the rotary arm 5, a spur 53 which lifts the cord with respect to the rotary arm 5.

At the ring 1 on the right in FIG. 1 the cord 4 is hooked to the retention means 3 located above the rotary arm 5 which must therefore pass not into the space located between the retention means 3 where the cord is already hooked and the adjacent free retention means, but into the space between the first retention means 3 still free and the following retention means. The order in which the retention means 3 have just been mentioned corresponds to the order in which they must appear at the rotary arm 5, which defines the direction of rotation of the two rings 1, namely from the bottom towards the top in FIG. 1. At the left-hand ring 1 in FIG. 1, the cord 4 is hooked to the retention means 3 located below the rotary arm 5, which must therefore pass into the space located between the retention means 3 where the cord is already hooked and the adjacent free retention means.

In the center of the rotary arm 5 there is fastened a cord engaging element 54 for maintaining the tension of the cord 4; due to the fact that the axis of rotation 50 is radially to the outside of the cylinder defined by the retention means 3, the hooking of the cord on the retention means 3 which are located to the right in FIG. 1 is effected at a place of the trajectory of the orifice 52 beyond the point where the movement of the orifice 52 has caused the feeding of a maximum length of cord 4, namely a length 40 of cord 4. This point is on the straight line defined by the last retention means 3 where the cord 4 is hooked and the place 57 where the cord emerges from the drive shaft 56. The tension maintaining element 54, constituted in this example by a curved rod, must be shaped in such a manner as to release the cord 4 as soon as it is no longer necessary to retain it. Such a tension maintaining element 54 is not always indispensable when the length-compensating means otherwise provided suffice to make certain that the cord 4 is always taut.

At its center, the rotary arm 5 has a recess 58 which makes it possible to adapt the distance between the orifice 52 and the axis of rotation 50 to the distance between the retention means 3 of one ring 1 with respect to the other, this distance being conditioned on the length of the length 40 of cord 4 to be laid.

In order to assure a suitable presentation of the support arms 2 with respect to the rotary arm 5 one can provide, on each side, a shaft 6 which bears a helicoidal groove 60 engaged on the support arms 2 and this in the immediate vicinity of the trajectory of the rotary arm 5. Thus the positioning of the end 20 of the support arms 2 is made firm during the passage of the rotary arm 5. Of course, the rotation of these shafts 6 is synchronized with that of the rotary arm 5 by the notched belt transmission 61.

The cord 4 is unwound from a bobbin 41 at a speed imposed by two rollers 90 which rest against each other and between which the cord 4 is introduced. The speed of these rollers is regulated by a motor 93 the speed of which is dependent on the average consumption of cord 4. The cord 4 then passes into a system 91 which assures substantially constant tension and the compensation in length necessary due to the fact that the delivery of cord by the rotary arm 5 is variable. The system 91 which is shown operates due to a dry air pressure (feeding with air through the tube 92) acting on the cord 4 passing between two parallel plates 910 which are spaced slightly further apart than necessary in order for the cord 4 to slide freely between them. The cord 4 forms a loop there, shown in dashed line, the average size of which is maintained constant by the servocontrol controlling the speed of the motor 93. The cord 4 then comes to the center of the rotary shaft 5 through a hole provided at the center of the drive shaft 56 and then comes to the outlet orifice 52.

According to the invention, a method of manufacturing a tire having at least one reinforcement formed from a continuous cord is characterized by the fact that:

(a) one or more layers of rubber are applied on a rigid core 7 which defines the shape of the inner surface of the tire and the continuous cord 4 is hooked to retention means 3 disposed in two circles which are at a distance apart corresponding to the length of the path of the cord 4 from one side of the reinforcement to the other so that the cord 4 disposed in this way defines a cylinder by a plurality of passes back and forth from one retention means 3 to another, (b) the rigid core 7 is inserted within the cylinder, (c) by a suitable movement of the retention means 3, the cord 4 which is disposed in this way is folded back on and around the rigid core 7, (d) anchoring of the cord being assured, the retention means 3 are released, (e) manufacture of the tire is continued.

The layer of rubber with which the rigid core 7 is covered immobilizes the lengths 40 of cord 4 when they are placed on the core 7. It therefore participates in the anchoring of the cord 4. The anchoring of the cord 4 is also assured by a bead ring as known per se.

After this general description, the invention will now be described more in detail, following the course of manufacture of a reinforcement.

Figure 11:
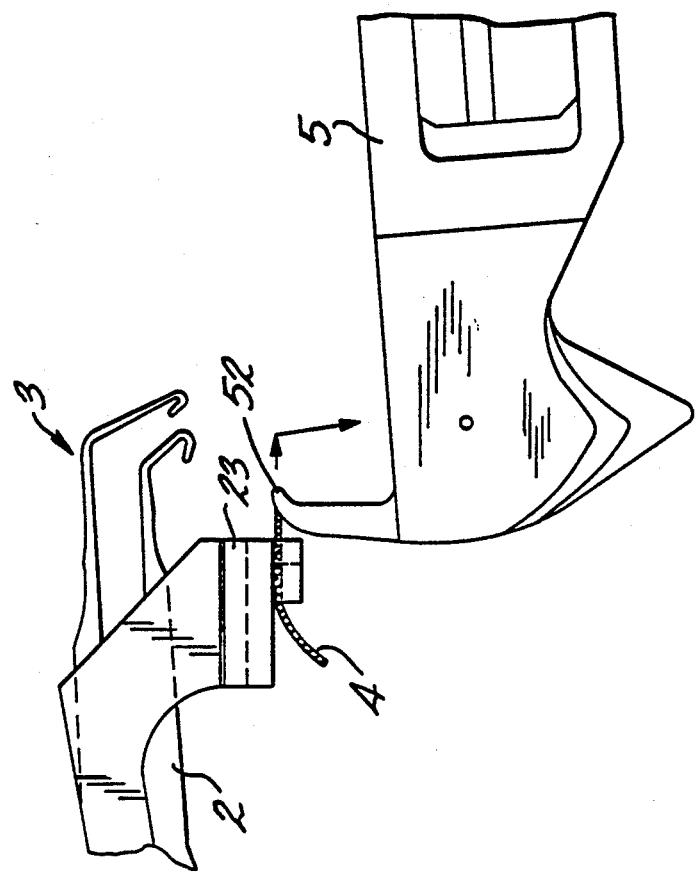
FIGS. 10 and 11 show in detail the starting of the operating cycle of the apparatus.
Figure 10:
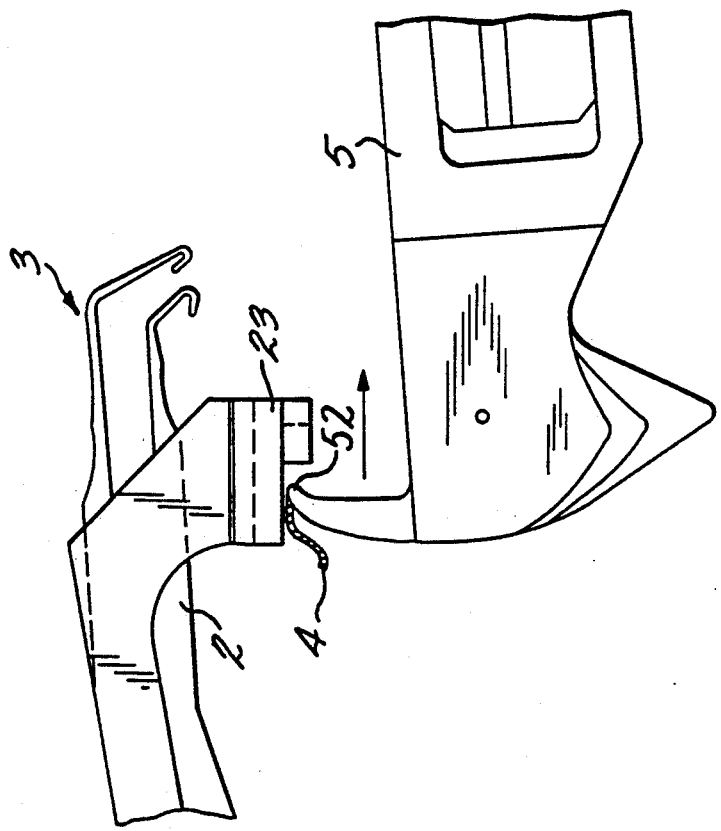

In order to start the manufacture of the reinforcement, the cord 4, threaded into all the laying members which are formed by the rotary arm 5, the drive shaft 56, the tension compensating system 91 and the drive rollers 90 is first of all hooked to a clamp 23 which is rigidly fastened to one of the support arms 2 of the left-hand ring 1 in FIG. 1. As shown in FIG. 10, the rotary arm 5 at the rear end of which the cord 4 protrudes is brought back to the height of the support arm 2 bearing the clamp 23. Thereupon the rings 1 of the support arms 2 are moved away axially so that the clamp 23 grasps the cord 4 (as shown in FIG. 11) whereupon they assume the spacing corresponding to the position of the hooking of the cord 4 to the retention means 3.

The free end of the cord 4 being thus maintained in the vicinity of the retention means 3 which the rotary arm 5 has just left above and behind it, the rotation of the rotary arm 5 causes the feeding of the amount of cord 4 necessary for the progressive production of the reinforcement, hooking the cord 4 successively to all the retention means 3, effecting as many turns as there are retention means 3 on a ring 1, thus producing a cylinder formed of as many lengths 40 of cord 4 as there are retention means 3 on the two rings 1. By way of example, for the production of the rayon carcass reinforcement of a passenger car tire, rings 1 having from 500 to 700 retention means 3 are used.

When the cord 4 is hooked to all the retention means 3, a complete cylinder is formed by the lengths 40 of cord 4; the cord 4 is fastened to the length 40' of cord 4 joining the clamp 23, for instance by a glue spot, and is then cut.

For this purpose it can be noted from FIG. 12 that the rotation of the rotary arm 5 is stopped when the cord 4 is retained by the tension maintaining element 54 formed here of a cylindrical prominence the upper face of which is an inclined plane. A push member 65 then lifts the cord 4 in order to release it from the tension maintaining element 54. Under the action of the tension compensating system 91, the cord 4 tends to form a straight length 40" between the outlet orifice 52 of the rotary arm 5 and the last retention means 3 to which the cord 4 has been hooked. This length 40" and the length 40' rejoining the clamp 23 they intersect above a head 65, which is moved against the lengths 40' and 40". The head 65 has a ramp over which liquified polyethylene is fed to glue the lengths 40' and 40" of the cord 4 at the place where they intersect, and it has knives 66, which can be better seen in FIG. 12a (seen in the direction of the arrow "a" in FIG. 12), assuring the cropping of the lengths 40' and 40" rejoining the clamp 23 and the outlet orifice 52 of the rotary arm 5, respectively.

Figure 2:
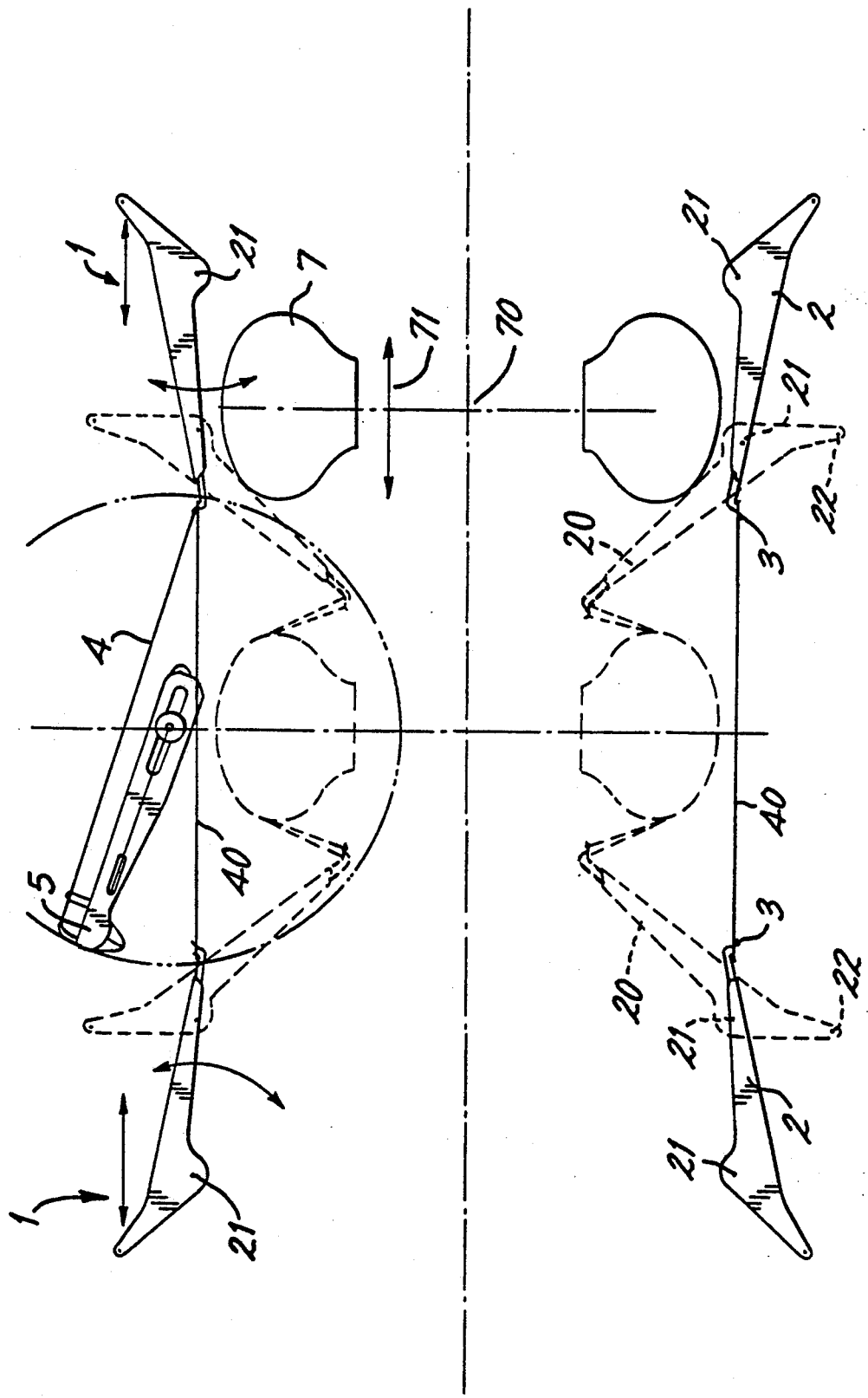
FIG. 2 is a section showing the arrangement of different parts at different stages.

Referring to FIG. 2, it is seen that the apparatus is provided with means permitting the insertion of a rigid core 7 radially to the inside of the circle formed by the retention means 3. During the putting in place of the lengths 40 of cord 4, this inner space must remain free in order not to interfere with the movement of the rotary arm 5. The means which permit the insertion of a core 7 are formed essentially of a free space 70 located radially to the interior of one of the rings 1 of support arms 2, the space 70 being larger than the size of the core 7 for at least one position of the support arms 2, and by a suitable conventional system of advance and retraction, such as a piston, (indicated schematically by an arrow 71 in FIG. 2) of the core 7 which introduces the latter into and between the rings 1 or removes it from its position between the rings 1.

When the phase of the putting in place of the lengths 40 of cord 4 is completed, the core 7 which has been previously provided with a layer of rubber constituting the inner skin of the tire and participating in the anchoring of the cords 4 is introduced into the inside of the cylinder formed by the lengths 40 of cord 4. The core 7 has been shown in solid line in an intermediate position during its insertion and in dashed line in central position between the rings 1. The solid line showing of the support arms 2 corresponds to the position which they occupy during the hooking of the cord 4 (see FIG. 1) and during the insertion of the core 7, while the dashed line shows a subsequent position of the same support arms 2 during the folding. The superimposing in one and the same figure of these successive stages makes it possible clearly to understand the movements to be carried out. Likewise, the reference to the movement of the rotary arm 5 in this same FIG. 2 makes it possible clearly to note the utility of the introduction of the core 7 after the production of the cylinder formed by the lengths 40 of cord 4.

If one does not provide for this insertion through the interior of one of the two rings 1, one is led to produce the cylinder of lengths 40 of cord 4 while the core 7 is already axially between the two rings 1, which would therefore make it necessary to produce the cylinder at an exaggeratedly enlarged diametrical position in order not to interfere with the movement of the rotary arm 5. This would lead to a bulky apparatus and would lengthen the folding movement of the support arms 2, which movement is explained in further detail below.

Figure 3:
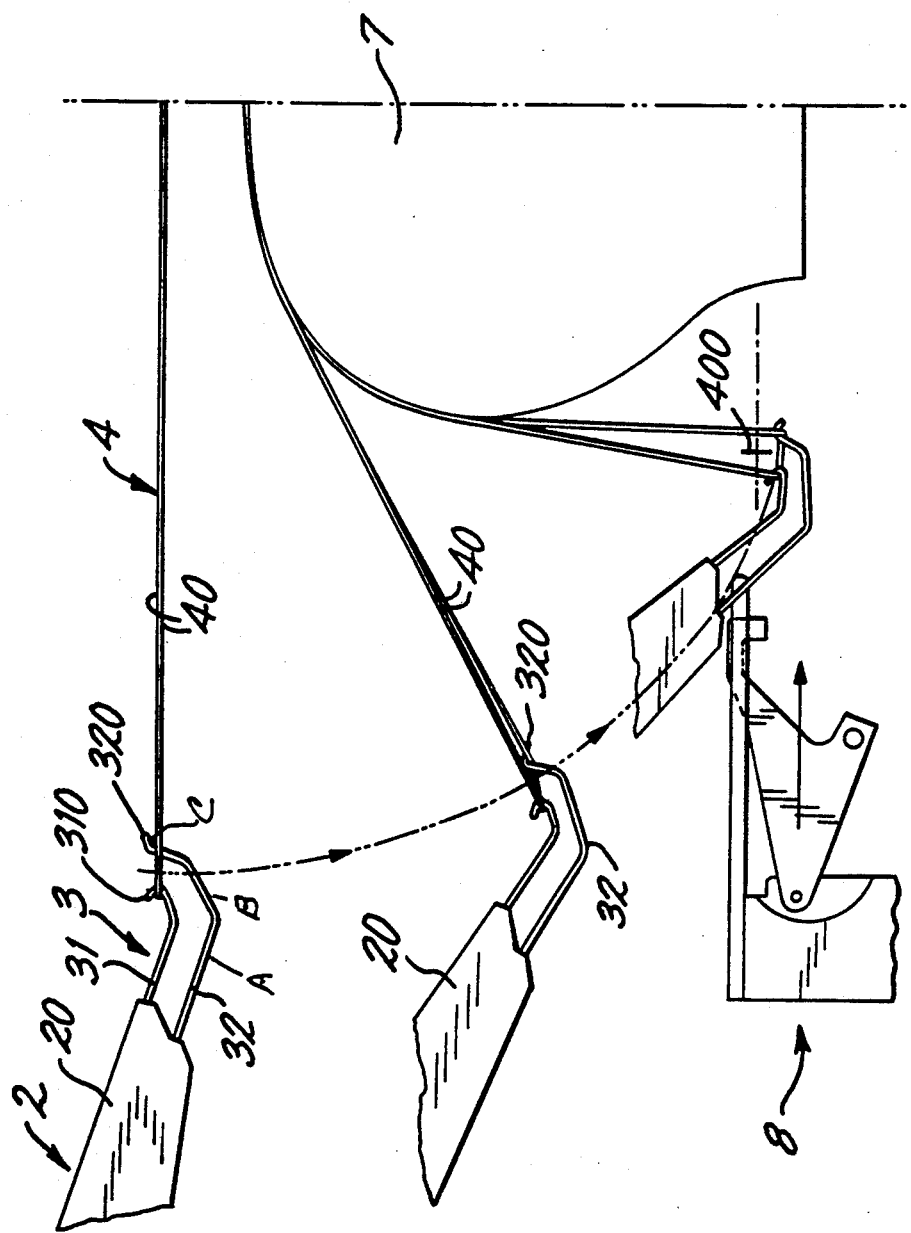
FIG. 3 illustrates a particular movement.
Figure 4:
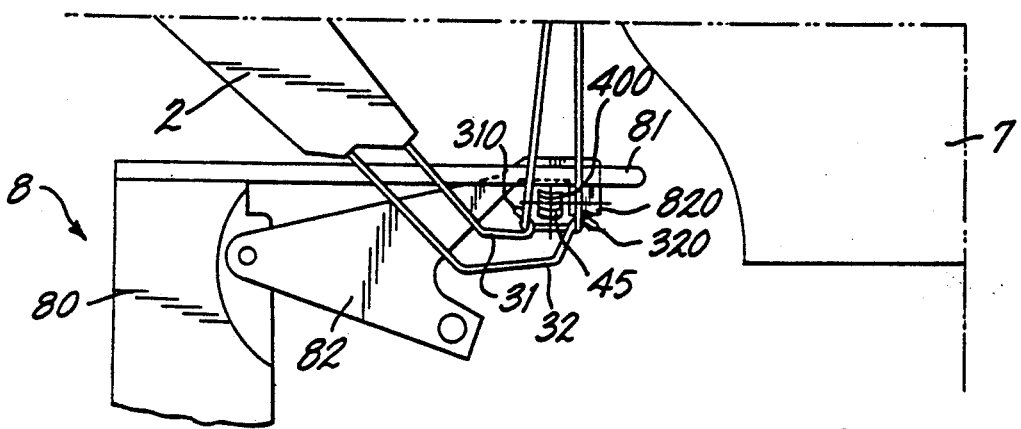
FIGS. 4 to 8 illustrate the anchoring of the carcass reinforcement on a bead ring.
Figure 5:
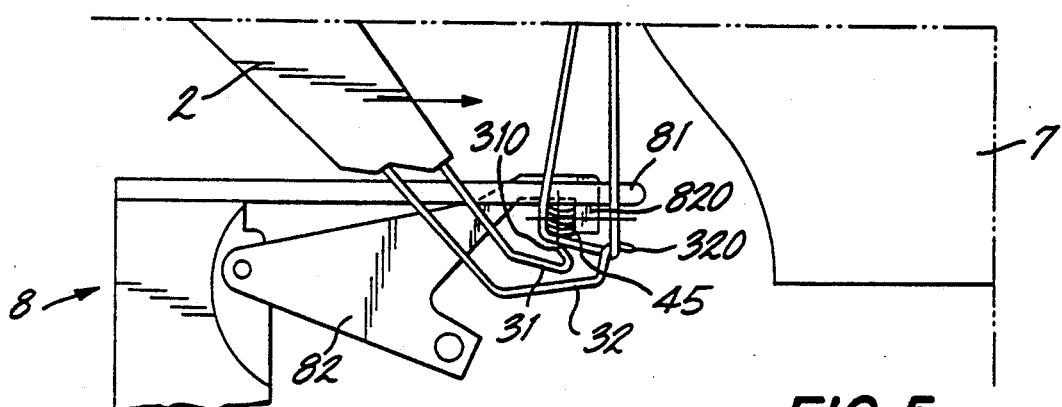

In FIG. 3 it is seen that the retention means 3 are formed by two hooks 31 and 32. In the stage of manufacture explained above, only the first hook 31 is necessary in order to assure the hooking of the cord 4. It is therefore shaped in such a manner, in this instance a reversely bent end, as to retain the cord 4 presented by the rotary arm 5. It will be noted that the projections in a radial plane of the end point 310 are in opposite direction in the two rings 1. The second hook 32 is disposed in such a manner that at this stage each of the two lengths 40 (superimposed in the upper part of FIG. 3) is disposed on opposite sides of the second hook 32.

Both hooks 31 and 32, as shown in FIG. 3, are formed with portions A which extend from a support arm 2, portions B bent with respect to the portions A, the portions A and B of each hook defining a plane, and a bent end C (see also FIG. 15) which extends laterally of and diagonally to the plane, bent end C of the hook 32 being spaced inwardly of or closer to the axis 50 than the reversely bent end C of the hook 31.

Upon the folding of the end 20 of the support arms 2 radially towards the inside and axially towards the core 7, the second hook 32, the end point 320 of which is shaped for this purpose, hooks one of the lengths 40 of cord 4 in order to start the formation of a loop 400. It will be noted that this folding takes place by effecting the axial moving together of the pivot points 21 in coordinated manner between the two rings 1, while maintaining a push on the drive points 22. This push balances out the tension of the cords 4 the variations of which must preferably be limited (for example, variations in a ratio of 1 to 2 are satisfacory). In this way, as soon as there is axial movement together of the rings 1, there is automatically a tilting of the ends 20 of the support arms 2 radially towards the inside in order to maintain the tension in the cords 4. Thus, it is the cords 4 themselves which define the trajectory of the retention means 3 during the folding of the support arms 2 around the core 7.

Figure 9:
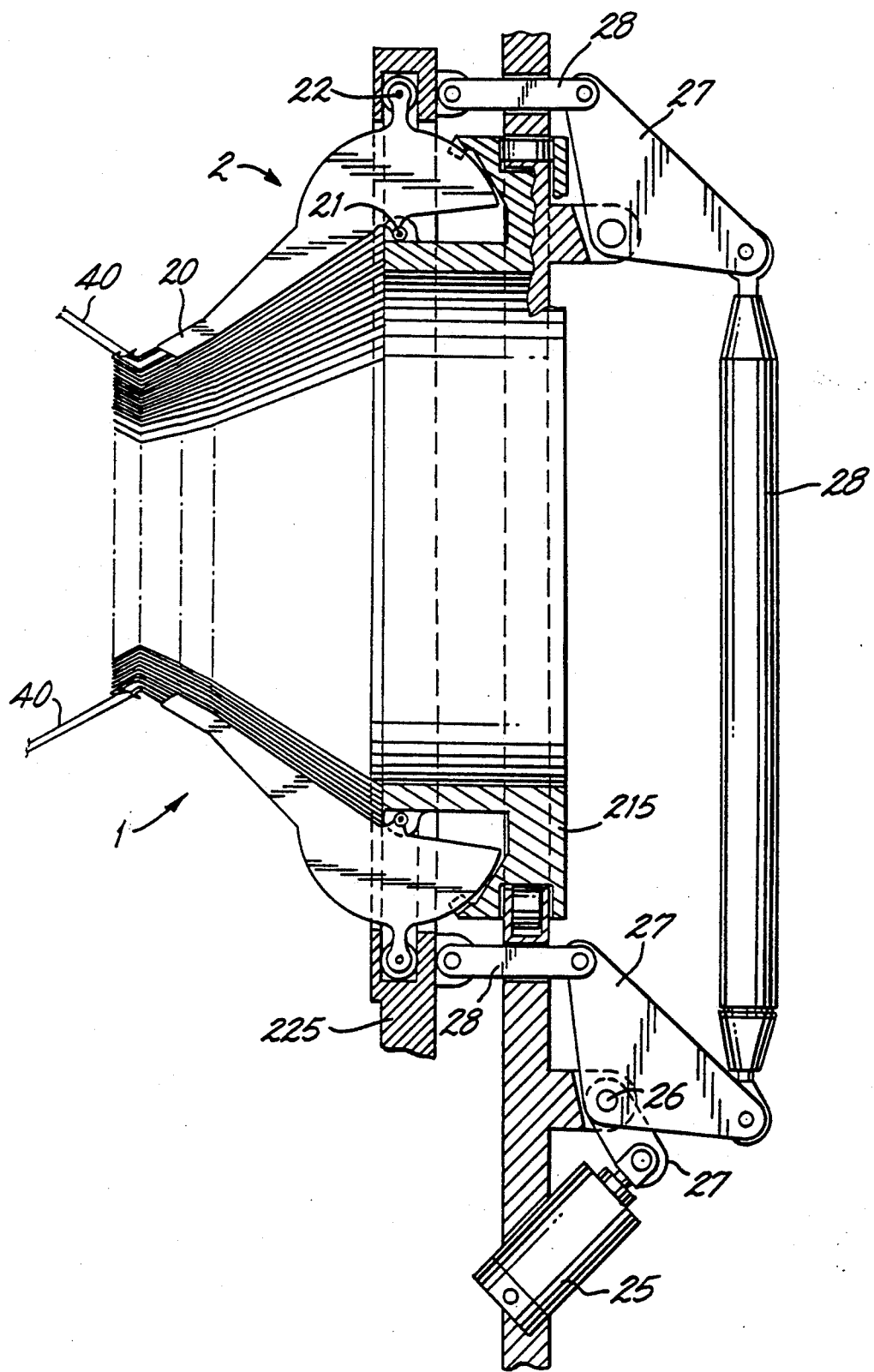
FIG. 9 shows the driving of the movements of certain parts of the apparatus.

FIG. 9 makes it possible to understand how the push can be effected so that the tension in the cord 4 is substantially constant, whatever the inclination of the lengths 40 with respect to the ends 20 of the support arms 2 (see FIG. 2). The pivot points 21 of the support arms 2 are, for each ring 1, integral with a plate 215.

These two plates 215 can be brought together or moved apart, preferably symmetrically. The drive points 22 of each ring 1 are all locked axially with respect to a plate 225 and can move radially along the plates 225. Considering by itself the ring 1 mounted on the plates 215 and 225, the relative distance between the plates 215 and 225 controls the swinging of the support arms 2 while the axial position of the plates 215 determines the axial position of each ring 1 of support arms 2. A piston-cylinder unit 25, of constant push, urges a shaft 26 in rotation via a rocker 27. This movement is returned by rockers 27 and rods 28 which transmit the push necessary in order to obtain a substantially constant tension in the lengths 40 of cord 4. It will be noted that this push is variable. It must be weaker the larger the angle which the lengths 40 form with the end 20 of the support arms 2. This push is obtained by adapting the length of the arms of the rockers 27, the angles which the arms of the rockers 27 form, as well as the relative angles between the rockers 27 and the rods 28.

In this particular embodiment of the method of manufacture, the anchoring of the cord 4 comprises the placing of a bead ring 45, effected in the following manner:

(a) during the folding, each retention means 3 starts the creation of a loop 400 in the cord 4 at the place where the cord 4 leaves towards a retention means 3 on the axially opposite side, (b) at least some of the loops 400 thus started are closed at a level radially outside the retention means 3, (c) several turns of a profile member are inserted into the loops 400 thus created, (d) the turns are held together so that they constitute a bead ring 45.

The few turns of the profile member thus constitute a bead ring 45. Preferably the profile member has a curved shape the convex portion of which is directed radially towards the axis of rotation of the tire during the course of manufacture. In this way, the successive turns are superimposed very easily over each other.

The apparatus of the invention further comprises (see FIGS. 4 to 8) a device 8 used at the time of the anchoring of the cord 4 to a bead ring 46 on each side of the core 7. The use of this device 8 is adapted to the shape of the hooks 31 and 32 the points 310 and 320 of which are directed axially in opposite directions.

Figure 6:
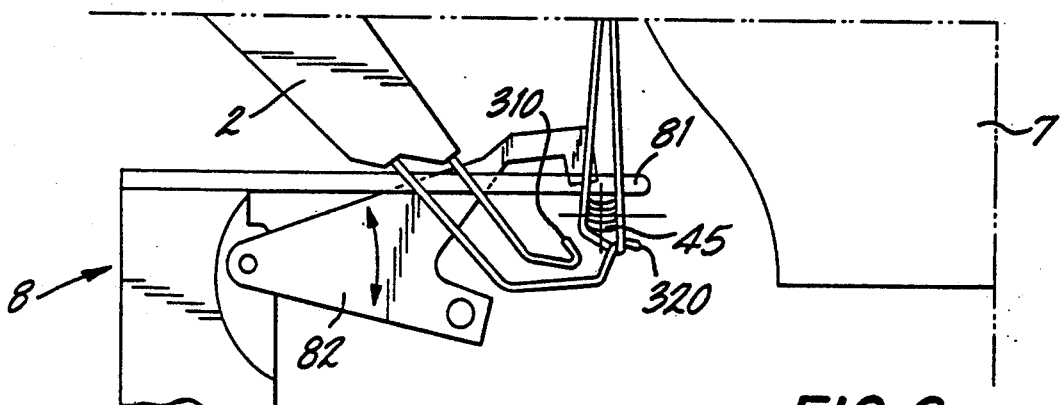
Figure 7:
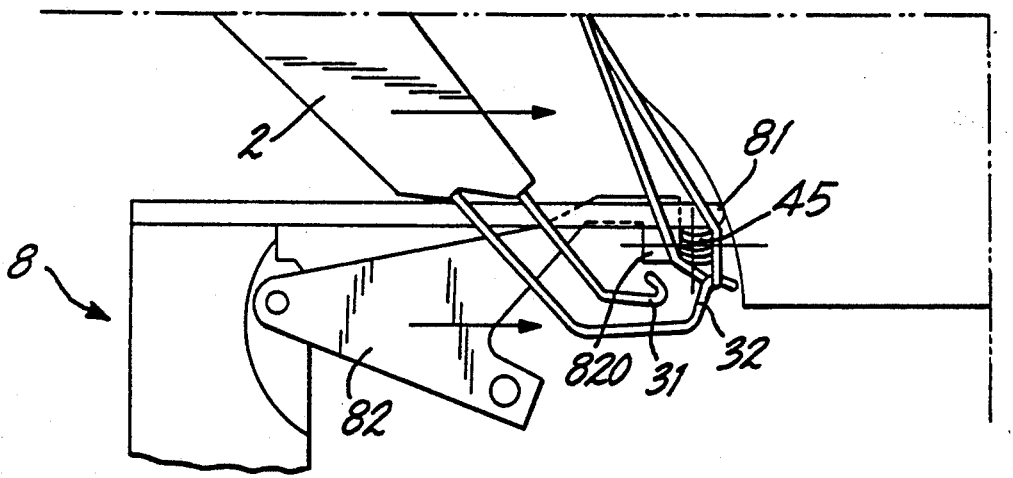
Figure 8:
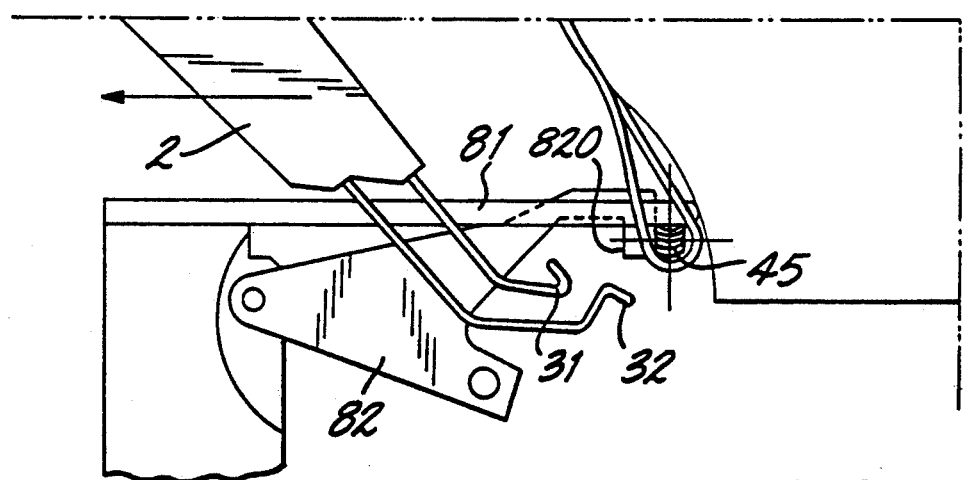

This device 8 comprises a plurality of assemblies 80, preferably at least fifty on the circumference. These assemblies 80 are rigidly connected to each other and movable axially (simultaneously). They are formed essentially of e straight rod 81, which is parallel to the axis of the rings 1 and therefore to the axis of the core 7, that is to say to the axis of rotation of the tire during manufacture and of a swinging finger 82. As the width of the core 7 at the level of the bead rings 45 is less than the maximum width, there are two positions corresponding to the retention by a bead ring 45 of the tensioned cords 4, one against the core 7, which is the final position of the bead ring 45, and another spaced from the core 7. The folding of the retention means 3 is stopped upon the first encounter of these positions. The anchoring device 8 is brought axially to the core 7 (see FIG. 4) in such a manner that the straight rods 81 close a quadrilateral which is furthermore formed by the cord 4, that is to say bar the opening of some of the loops 400, and it determines the outside diameter of the bead rings 45. This makes it possible to create a guide path for the insertion of the bead ring 45. The latter consists of several turns of a profiled member which are introduced tangentially into the loops 400 in front of one of the assemblies 80 and which is threaded completely therein, by pushing it. The bead ring 45 is then terminated by hooks surrounding the layers of profiled member at several places on the circumference and in particular in the zones of covering of the start and end of the spiral formed by the profiled member, or by any suitable means of fastening. The hooks 31 and 32 can then be released. This takes place due to the fingers 82 which maintain the bead ring 45 axially by their ends 820 which are directed towards the bottom and lowered axially on the inner side of the ring 45 while the support arms 2 are pushed back axially towards the core 7. This movement (see FIG. 5) makes it possible to release all the first hooks 31. The fingers 82 are then raised, the device 8 moves axially away from the core 7 in order to be able to lower the ends 820 axially on the outside of the bead ring 45 (FIGS. 6 and 7). The bead ring 45 is pushed against the core 7 by the axial movement of the device 8 towards the core 7, while the support arms 2 are moved axially away (FIGS. 7 and 8), which releases the last hooks 32. The flexibility of the hooks 31 and 32 must be compatible with the necessity of their resuming precisely their position in each ring 1 after unhooking, even if all the hooks of one and the same type are not unhooked all simultaneously.

At this stage, the core 7 bearing the reinforcement anchored to bead rings 45 can be removed from the apparatus. The manufacture of the tire is continued, possibly by the production of other reinforcements also constituting the carcass reinforcement, by the placing of the crown reinforcements (belt), the sidewalls and the tread.

Variant embodiments of certain members will now be described, with reference to FIGS. 3 to 18.

The rotary arm 5, shown in FIGS. 13 and 14 (as well as in FIG. 12), is telescopic so that the length between the outlet orifice 52 and the axis of rotation 50 can automatically adapt itself to the size of the tire to be manufactured. For example, a cable drive is used in order to shorten the length and a rod and ball drive in order to lengthen it. The length therefore varies as one-half of the axial distance between the retention means 3 of a ring 1 with respect to the axially opposite ring 1, and this within the range in which the variation of this distance corresponds to the adjustment of the apparatus in accordance with the size of the tire to be produced or, more precisely, in the case of the construction of a tire reinforcement, in accordance with the size of the length 40 of the cord 4 to be hooked to the retention means 3.

For the starting of the operation of the apparatus using the clamp 23, the rings 1 can move axially towards each other beyond the adjustment range, without the length of the telescopic rotary arm 5a being modified.

In this same FIG. 13, it is seen that the orientation of the point 320a of the hook 32a is substantially identical to the orientation of the point 310a of the hook 31a while in the embodiment described above, the orientations of the points 310 and 320 diverge substantially.

Figure 15:
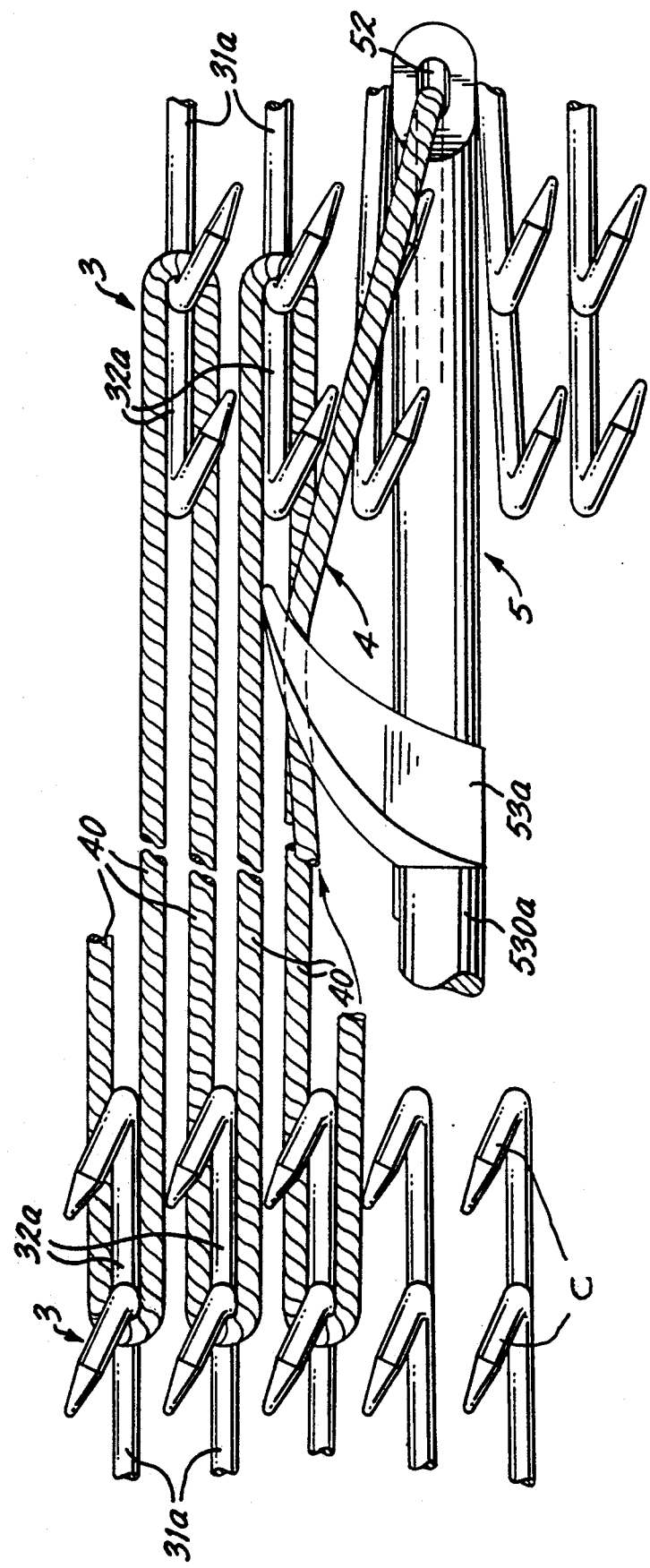
FIG. 15 illustrates one configuration of the reinforcement in the course of manufacture.
Figure 16:
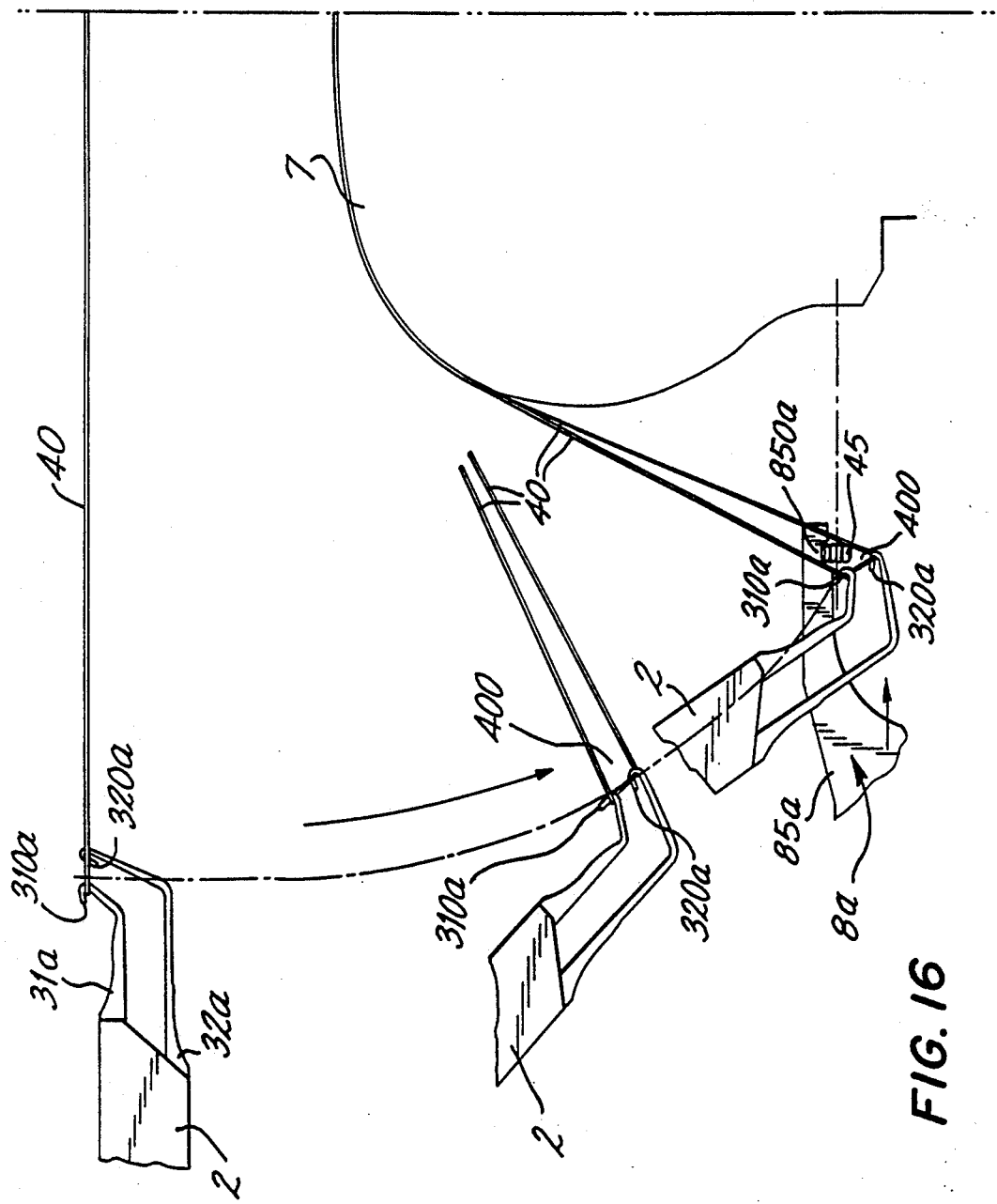
FIGS. 16 to 18 illustrate a variant embodiment of the invention.
Figure 18:
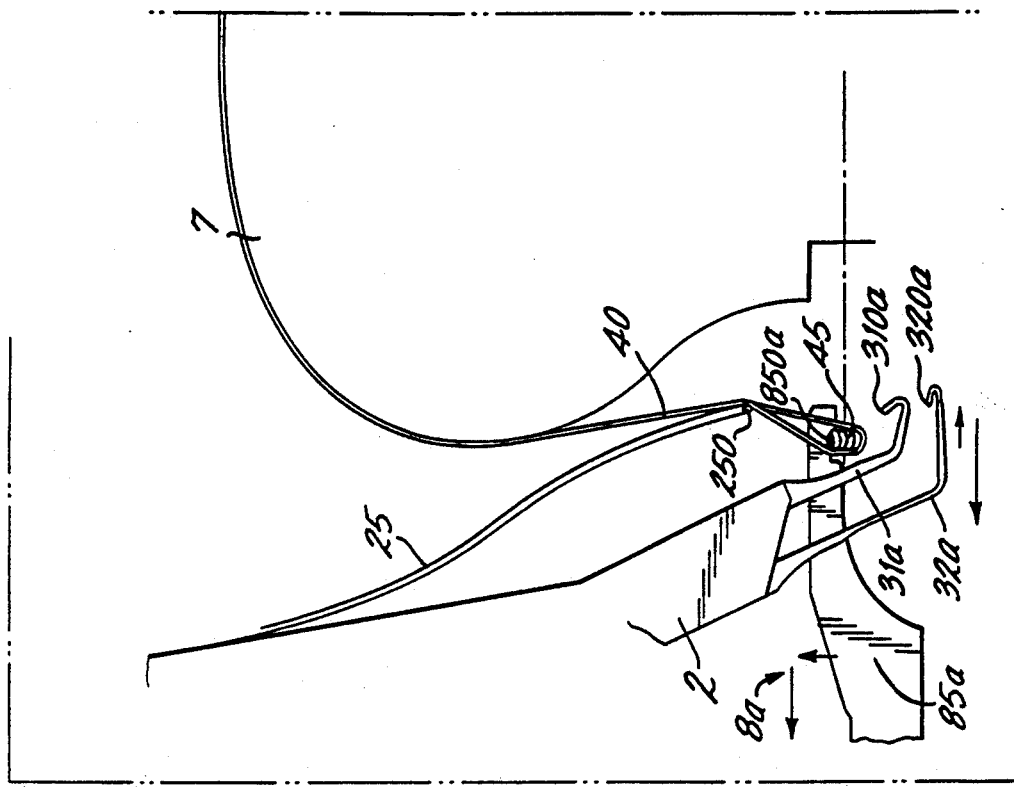
Figure 17:
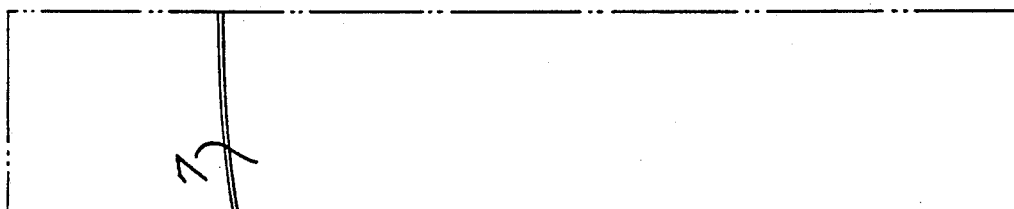

FIGS. 13 and 14 are views in planes perpendicular to each other. It is seen that the orientation of the points 310a and 320a is axially towards the outside of the apparatus, tangentially in opposite directions (see FIG. 14), radially towards the inside in the case of ring 1 to the right in FIG. 14, that is to say on the side where the rotary arm 5 penetrates into the interior of the cylinder formed by the lengths 40 of cord 4, and radially towards the outside in the case of the ring 1 on the left in FIG. 14, that is to say on the side where the rotary arm 5 emerges from the cylinder formed by the lengths 40 of cord 4. In general, the point of the hooks (310, 320, 310a, 320a) is located outside the plane in which the base of the hooks (31, 32, 31a, 32a) is included. The retention means 3 (hooks 31a and 32a) are therefore interchangeable between the two rings 1. The concept of these retention means 3 and the presentation of the cord 4 on the retention means 3 is determinative so that the lengths 40 of cord 4 form a figure "S" not a figure "8" when they define the cylinder of lengths 40. This means that there can be no superpositioning of cords radially. This so-called figure "S," without superimposing of cords, can be clearly noted from FIG. 15. If there is a superimposing of cords, one will find this superimposing of cords again in the tire, which may be undesirable for the operation of the tire. FIG. 15 also makes it possible clearly to see how the cord 4 can suitable be presented to the retention means 3 on the right and how the cord 4 disposes itself on all the retention means 3. At the left ring 1 the cord 4 is presented to the retention means 3 while the rotary arm 5 emerges from the plane of the figure and passes above retention means 3 which are still free, the spur 53a being in lowered position.

In order to optimize the hooking of the cord 4 on the retention means 3 of both the left-hand ring 1 and the right hand ring 1, it may be advantageous that the action of the spur 53a not be symmetrical. The spur 53a is lifted by the action of a rod 530a urged by a cam 531a to present the lifted cord 4 in front of the right-hand ring 1, as shown in FIG. 14. On the axially opposite side, the spur 53a, in position of rest, lifts the cord 4 much less. The rotary arm 5 bearing the spur 53a being telescopic, the rod 530a must, to be sure, also be telescopic.

The concept of the retention means 3 of this variant embodiment permits the hooking of the cord 4 and then permits the forming of a loop 400 upon the folding, as explained above, while permitting the unhooking of the retention means 3 after the insertion of a bead ring 45.

The folding is similar in its general principle to what has been explained above. The differences concern, essentially, the unhooking of the retention means 3 (see FIGS. 16 to 18). The apparatus comprises, on each side of the core 7, a device 8a which comprises essentially a plurality of blades 85a which are movable simultaneously axially and simultaneously radially while remaining parallel to the axis of the rings 1. These blades 85a have a groove 850a which is oriented radially towards the inside. This groove 850a, inserted between the lengths 40 of cord 4 to close a quadrilateral which is furthermore formed by the cord 4 which has formed the loops 400, determines the outside diameter of the bead ring 45. These grooves 850a therefore guide the insertion of the bead ring 45. When the latter is inserted and the hooks 31a, 32a are placed, one proceeds with the release of the cord 4 from the retention means 3 by means of the blades 85a. The bead ring 45 being held axially by the grooves 850a of the blades 85a, the two rings 1 are brought towards each other. The support arms 2 therefore advance axially towards the center of the core 7 which, the cords 4 being maintained by the bead ring 45 immobilized by the blades 85a, assures the unhooking of the hooks 31a and 32a, the points 310a and 320a of which are here oriented in the same direction. The push applied to the drive points 22 thereby causes the complete swinging of the support arms 2. It is preferably provided that, at the same time, the lengths 40 of cord 4 are applied against the core 7 under the effect of the springs 25. These springs 25 are of "U" shape, the substantially parallel and flexible arms of which are each integral with a support arm 2 and the base branch 250 of which rests constantly against the lengths 40 of cord 4. Due to these springs 25, the lengths 40 constituting the carcass reinforcement remain taut after the unhooking of the retention means 3. The blades 85a are then raised, moved back axially and then lowered axially on the outside of the bead ring 45. The bead ring 45 can then be advanced axially to its final position against the core 7. This movement preferably is accompanied by an axial moving together of the rings 1 of support arms 2 so that the base branch 250 of the springs 25 can apply the lengths 40 of cord 4 against the core 7. For this purpose, the springs 25 are attached to the support arm 2 in such a manner that the axial movement of the rings 1 towards the core 7 causes the base branches 250 to descend, moving along the core 7.

The method and the apparatus described make it possible to produce reinforcements the cords 4 of which, disposed in the sidewalls, may be radial or not and the cords 4 of which, disposed beneath the tread may be parallel to the axis or not. One can possibly modify the angular position of the rings with respect to each other before and/or during the folding in order to obtain the desired architecture for the reinforcement.

The tire obtained by the means illustrating the invention comprises a carcass reinforcement without turn-up, by contrast with the arrangement universally adopted at the present time in the tire industry in which the carcass reinforcement is turned up around the bead rings. However, the invention also makes it possible to effect such turn-ups by adapting the distance apart of the retention means 3 and their folding around the core 7.

We claim:

1. A cord retention arm for use in an apparatus for making a tire reinforcement from a continuous cord and applying the reinforcement to a tire core, said apparatus including means for applying the cord on the cord retention arm in a cord receiving positon adjacent said tire core and a remote support for the cord retention arm spaced a substantial distance away from the cord receiving position, the cord retention arm having a length which spans the distance separating the cord receiving position adjacent said tire core and the remote arm support, said cord retention arm comprising a bent end terminating in a tip for receiving and supporting a loop of the cord and an extended mounting support spanning said distance and terminating in an opposite mounting end spaced by said distance from said bent end for mounting the cord retention arm and positioning the bent end relative to the extended mounting support, said extended mounting support having at least two portions spanning said distance, one of which portions is bent with respect to the other portion at an obtuse angle to define a plane, one of the portions being spaced more remotely from the bent end and serving to anchor the arm to said remote arm support, and the other portion being intermediate the more remote portion and the bent end and serving to position said bent end relative to the extended mounting support, said bent end being connected to the intermediate portion at one end of the spanned distance and opposite the mounting end, the bent and mounting ends being the furthest spaced apart points on the cord retention arm measured in a rectilinear direction, the distance between the tip of the bent end and its connection to the intermediate portion being small in relation to the distance spanned by the extended mounting support, said bent end extending laterally of and diagonally to the plane.

2. A cord retention arm for use in an apparatus for making a tire reinforcement from a continuous cord and applying the reinforcement to a tire core, said apparatus including means for applying the cord on the cord retention arm in a cord receiving position adjacent said tire core and a remote support for the cord retention arm spaced a substantial distance away from the cord receiving position, said cord retention arm comprising a bent end terminating in a tip adapted for receiving and supporting a loop of the cord and applying the loop around said tire core, and an extended flexible support having a length which spans the distance separating the bent end in cord receiving position and the remote arm support to which the flexible support is anchored, said flexible support having an outer portion spaced remotely from the bent end and terminating in a mounting end connectable to the remote arm support and an inner portion intermediate the outer portion and the bent end and being bent at an obtuse angle with respect to the outer portion to define with the outer portion a plane, said flexible support spanning said distance and spacing the bent end to receive the loop and said mounting end by said distance, said bent end being connected to the end of the inner portion remote from the mounting end of the outer portion, the bent and mounting ends being the furthest spaced apart points on the cord retention arm measured in a rectilinear direction, the distance between the tip of the bent end and said end of the inner portion to which it is connected being small in relation to the length of the flexible support, said bent end extending laterally of and diagonally to the plane.

3. A cord retention arm as set forth in claim 2 in which said bent end is reversely bent and the reversely bent end extends laterally of and diagonally to the plane.

4. A cord retention arm as set forth in claim 3 including another hook spaced apart inwardly from and connected with the first hook so that the hooks are capable of moving together from loop receiving to loop applying position, the second hook being adapted to engage a portion of the cord spaced inwardly from the end of the loop and cooperate with the first hook to open the loop when the reinforcement is being applied to said tire core.

5. A cord retention arm for use in an apparatus for making a tire reinforcement from a continuous cord and applying the reinforcement to a tire core, said cord retention arm comprising a first hook having a reversely bent end terminating in a tip for supporting a loop of the cord, a second hook having a bent end terminating in a tip and spaced inwardly from the first hook and the end of the loop for engaging a portion of the cord spaced inwardly from the end of the loop and cooperating with the reversely bent end to open the loop when the hooks are applying the reinforcement to the tire core, and a longitudinally extending common support for both hooks having a length spanning a distance between the cord receiving position of the reversely bent cord receiving hook and a remote part of the apparatus to which the cord retention arm is anchored and terminating in an anchoring end more remote from the bent end of said second hook than from the bent end of said first hook, the bent ends extending laterally and diagonally to the common support.

6. A cord retention arm as set forth in claim 5 in which said common support includes bent, flexible connections between the bent ends of each hook and the anchoring end of the common support, each bent connection including an outer portion and an inner portion bent with respect to the outer portion to define a plane, the flexible connection for the first hook being shorter than the flexible connection for the second hook, the bent ends of both hooks extending laterally of and diagonally to the planes of their respective flexible connections.

* * * * *